United States Patent
DeMarco et al.

(10) Patent No.: US 9,383,750 B2
(45) Date of Patent: Jul. 5, 2016

(54) SYSTEM FOR PREDICTIVELY MANAGING COMMUNICATION ATTRIBUTES OF UNMANNED VEHICLES

(75) Inventors: Stephen J. DeMarco, Binghamton, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 3550 days.

(21) Appl. No.: 11/002,057

(22) Filed: Dec. 2, 2004

(65) Prior Publication Data
US 2006/0121418 A1  Jun. 8, 2006

(51) Int. Cl.
G05D 1/00 (2006.01)
F41H 13/00 (2006.01)

(52) U.S. Cl.
CPC .............. *G05D 1/0088* (2013.01); *F41H 13/00* (2013.01)

(58) Field of Classification Search
CPC ..................................................... G05D 1/0088
USPC ................................................. 701/26, 23, 3
See application file for complete search history.

(56) References Cited

U.S. PATENT DOCUMENTS

| | | | |
|---|---|---|---|
| 5,054,111 A | 10/1991 | Goodwin | |
| 5,515,491 A | 5/1996 | Bates et al. | |
| 5,815,799 A | 9/1998 | Barnes et al. | |
| 5,815,816 A | 9/1998 | Isumi | |
| 5,910,947 A | 6/1999 | Futamura | |
| 5,926,469 A | 7/1999 | Norstedt et al. | |
| 5,982,813 A | 11/1999 | Dutta et al. | |
| 6,121,925 A | 9/2000 | Hilliard | |
| 6,167,263 A | 12/2000 | Campbell | |
| 6,169,728 B1 | 1/2001 | Perreault et al. | |
| 6,526,282 B1 | 2/2003 | Kadoshima et al. | |
| 6,529,738 B1 | 3/2003 | Forde et al. | |
| 6,578,005 B1 * | 6/2003 | Lesaint et al. | 705/8 |
| 6,590,865 B1 | 7/2003 | Ibaraki et al. | |
| 6,600,816 B1 | 7/2003 | Yamada | |
| 6,615,245 B1 | 9/2003 | McFall et al. | |
| 6,631,432 B1 | 10/2003 | Yamagishi | |

(Continued)

FOREIGN PATENT DOCUMENTS

| | | |
|---|---|---|
| DE | 19909419 | 7/2000 |
| EP | 0049160 A2 | 4/1982 |

(Continued)

OTHER PUBLICATIONS

Pending U.S. DeMarco et al. U.S. Appl. No. 10/799,562, filed Mar. 11, 2004 for A System for Predictively and Dynamically Allocating Communication Bandwidth.

*Primary Examiner* — Johnna Loftis
(74) *Attorney, Agent, or Firm* — Tarolli, Sundheim, Covell & Tummino LLP

(57) ABSTRACT

A system predictively determines data transmitted within a wireless network in accordance with a mission plan and changes to the mission plan. The system includes a first team member and a second team member. The first team member includes a first module for evaluating the changes to the mission plan encountered by the first team member and determining whether to transmit information of the change to the second team member. The first team member further includes a second module containing rules for evaluating changes to the mission plan encountered by the first team member. The first module utilizes the rules of the second module to predictively alter the mission plan.

8 Claims, 2 Drawing Sheets

(56) References Cited

U.S. PATENT DOCUMENTS

| | | |
|---|---|---|
| 6,653,970 B1 | 11/2003 | Mitra |
| 6,712,312 B1 | 3/2004 | Kucik |
| 7,043,369 B2 * | 5/2006 | Kolodner et al. .......... 702/3 |
| 2001/0029499 A1 | 10/2001 | Tuatini et al. |
| 2002/0072332 A1 | 6/2002 | Chang et al. |
| 2003/0098773 A1 | 5/2003 | Chakravarty et al. |
| 2003/0110028 A1 | 6/2003 | Bush |
| 2003/0163783 A1 * | 8/2003 | Chikirivao et al. ......... 715/513 |
| 2003/0164794 A1 | 9/2003 | Haynes et al. |
| 2003/0200013 A1 | 10/2003 | Chakravarty et al. |
| 2004/0038684 A1 | 2/2004 | Sugaya |
| 2004/0039779 A1 | 2/2004 | Amstrong et al. |
| 2004/0068415 A1 * | 4/2004 | Solomon ..................... 705/1 |
| 2004/0236563 A1 * | 11/2004 | Rachlin ...................... 703/22 |
| 2005/0202827 A1 * | 9/2005 | DeMarco et al. .......... 455/452.2 |
| 2007/0021880 A1 * | 1/2007 | Appleby et al. ....... G05D 1/104 701/23 |

FOREIGN PATENT DOCUMENTS

| | | |
|---|---|---|
| EP | 0825789 A2 | 2/1998 |
| JP | 209031 A | 7/2002 |

* cited by examiner

SYSTEM FOR PREDICTIVELY MANAGING COMMUNICATION ATTRIBUTES OF UNMANNED VEHICLES

FIELD OF INVENTION

The present invention relates to a system for managing unmanned vehicles, and more specifically, to a system for predictively managing unmanned vehicles.

BACKGROUND OF THE INVENTION

Conventional Unmanned Aerial Vehicles (UAVS) operate in various environments and terrains. Future UAV teams are envisioned to be highly autonomous, not requiring constant attention from a control base station. These autonomous UAV teams will likely communicate over a radio frequency link with the control base station. If several autonomous UAVs are operating as part of a team, these UAV team members will likely communicate with each other over a communication network as well. These UAV members will likely be required to inform each other of their respective and absolute positions and flight plans so that they don't hit each other and, since these UAV members are operating autonomously, to continually adjust flight plans to react to the environment, the terrain, and to enemy threats. Each UAV member in the team would communicate at unpredictable times with other members of the team asynchronously.

Members of such a team of UAVs would share the limited network data rate capacity with each other, with other teams of UAVs, and with other elements of the battle space. As a mission unfolds, the changing battle and consequent communication needs of each element of the force may change. The individual demands upon the communications network aggregate and may use up all of the available data rates such that the next separate demand would go unfulfilled in the immediate time scale.

When a UAV team enters a battle area, its communication demands may increase as the members collaboratively plan target engagements and flight plans. The members may simultaneously transmit and receive target tracks and flight plans that may rapidly change. The UAV members of such a team further may conduct collaborative sensing and targeting and update common relevant operational pictures (CROPs), command and control information, etc. Additional demands may also be placed on the limited network data rate capability by non-UAV elements of the battle space.

All of these simultaneous communication demands of the team place stress on the communication network of the team by using up the available data rate, or bandwidth. However, a network typically has "quality of service" algorithms to react and reallocate network resources to those UAV members using it the most. When this happens, some of the UAV members receiving a lower allocation of network resources will experience increased delays in their message deliveries, lost packets of information, and other types of service degradation (FIG. 1).

For example, assume that each UAV member needs a communications channel with a data rate of 2,000 kilobits per second (kbps) to transmit a 500 kilobit image file in 250 milliseconds (500/2,000). Typically, three images will be sent in succession and this would take about 750 milliseconds. Add another 250 milliseconds for various intermediary processing tasks and the entire process of transmitting and receiving the three images may take 1,000 milliseconds, or 1 second. Thus, the communications channel is entirely consumed by the transmission of these three images for 1 second.

Enlarge this concept to a team of five UAV members sharing a communications network with a maximum simultaneous capacity of 10,000 kilobits per second. This communications network would be able to support the transmission of five simultaneous three-image sets of files from these UAV members to a base station. In "non-stressful" situations, this example communication network's underlying data rate is sufficient to support all five UAV members.

However, typically other conditions may restrict the available data rate. Environmental conditions such as rain may reduce the data rate. Enemy jamming may reduce the data rate. Other friendly forces may consume the data rate of the same communications network (FIG. 1).

Assume these situations occur and the actual data rate available to the UAV team is only 5,000 kilobits per second. The communications network would then handle only two sets of three image files simultaneously. The network protocols would function in a reactive manner to reallocate the data rates to the earliest transmitted files, not necessarily the two most critical transmitted files. Assume that this takes 250 milliseconds.

Consequently, there would be an additional 250 millisecond delay before the communications network reallocates the available data rates. Furthermore, a third, presumed less critical, set of images would still be delayed with that third set possibly being the most critical set.

Such a conventional system is reactive in nature. Services are reallocated subsequent to the overload occurring within the network. At best, there may be a temporary "bubble" of overload before the qualities of service algorithms begin working. Sometimes a UAV using the most available data rate may not be the UAV with the highest priority, or critical mission need. At worst, the degradation of communications may persist for a period that may degrade the UAV team's critical mission effectiveness.

SUMMARY OF THE INVENTION

A system in accordance with the present invention predictively determines data transmitted within a wireless network in accordance with a mission plan and changes to the mission plan. The system includes a first team member and a second team member. The first team member includes a first module for evaluating the changes to the mission plan encountered by the first team member and determining whether to transmit information of the change to the second team member. The first team member further includes a second module containing rules for evaluating changes to the mission plan encountered by the first team member. The first module utilizes the rules of the second module to predictively alter the mission plan.

Another system in accordance with the present invention predictively determines data transmitted by an entity in accordance with a mission plan and changes to the mission plan. The system includes a mission planning subsystem, a communication subsystem, and an evaluator subsystem. The mission planning subsystem executes a current mission plan. The mission planning subsystem further predictively develops alternative mission plans in order to evaluate potential mission changes. The communication subsystem communicates changes to the mission plan to another entity. The evaluator subsystem includes an evaluator and a rules engine. The evaluator receives information concerning a change encountered by the entity and utilizes rules from the rules engine for determining whether to communicate the change to the other entity.

A computer program product in accordance with the present invention determines data transmitted by an entity in accordance with a mission plan and changes to the mission plan. The computer program product includes a first instruction for storing the mission plan in a common relevant operating picture, a second instruction for evaluating a change to the mission plan, and a third instruction for utilizing the second instruction for determining whether to communicate the change of the mission plan to another entity. The second instruction utilizes predetermined rules.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Figure 1:
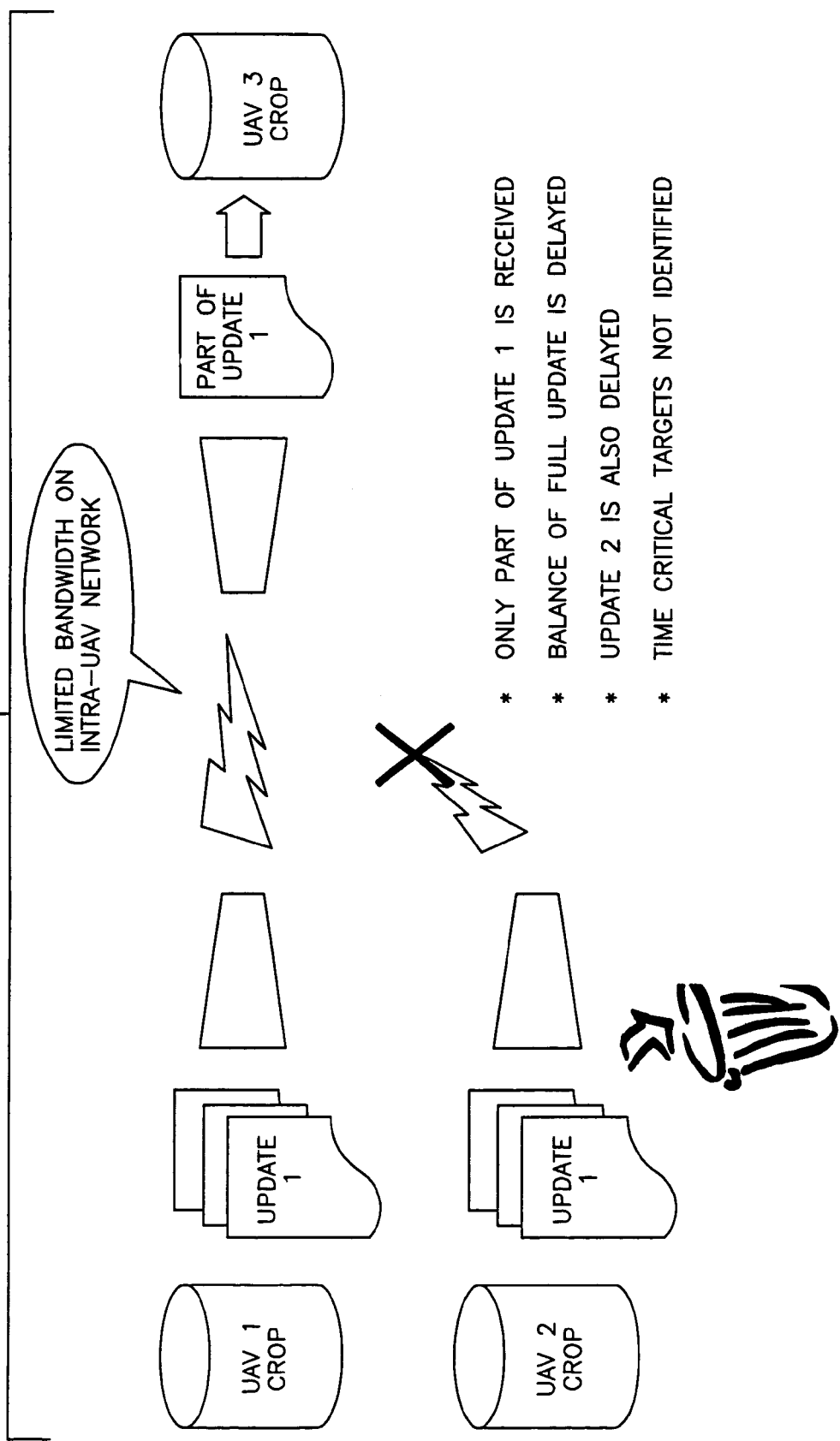
FIG. 1 is a schematic representation of an example system in accordance with the prior art.

The following description of an example embodiment depicts an example system of collaborative entities evaluating the impact of the changes on a team's mission against a rules engine and a predictive mission-planning engine. Only those changes containing significant impacts to the team's mission, either imminent impacts or longer-term threats to the mission (that cannot be easily corrected by a localized mission replan), will be transmitted between the collaborative entities. Unimportant changes will not be transmitted. Furthermore, the transmissions will be prioritized and scheduled to control the consumption of the bandwidth of a predetermined communication channel.

The mission-planning engine of each entity may replan for all entities involved within the collaborative framework. This may provide a predictive mechanism for the mission plans of the team. For example, a change may be unimportant to the mission of the collaborative entities over the next five minutes, but may have a major impact in thirty minutes. The converse may also be true.

A system in accordance with the present invention may control priority, schedule, and timing of communications between a collaborative team of unmanned vehicles (UAVs), or entities, thereby providing a deterministic and efficient use of available communication channels. Each entity operating on a modern battlefield typically maintains an individual digital database of relevant information concerning a mission plan, a flight plan, environmental conditions, a 3-D map, locations of friends and foes, condition of onboard stores, damage self-assessment, etc.

Teams of entities working collaboratively may need to share at least some part of this information between themselves, as the mission unfolds, as conditions change, and as plans are updated and revised. The sharing and updating of this information may be conducted over radio frequency communications links.

For example, consider a collaborative team of three Unmanned Aerial Vehicles (UAV1, UAV2, UAV3) flying at an altitude of 1,000 feet and separated from each other by 6,000 feet. UAV1 may sense an anomaly, which could possibly be a target. UAV1 may make a determination to investigate further. This determination may initiate a series of radio frequency communications between the three UAVs culminating in UAV1 transmitting a revised flight plan to UAV2 and UAV3. UAV2 and UAV3 may acknowledge this change in the flight plan of UAV1 back to UAV1. UAV1 then flies on the new flight plan and investigates the anomaly more closely. This is a simple, generic example analogous to the other classes of information exchanges, described above, that may need to be communicated between collaborating entities on a battlefield.

A conventional approach to communicating this data is to transmit an entire updated file that contains all of the information. However, transmission of all of this information may consume all, or a significant amount, of an available communications channel, leaving little bandwidth for the use of other entities that might need to communicate simultaneously.

Another conventional approach is the transmission of only the changed data. This reduces the amount of data transmitted and mitigates consumption of the available communications channel. However, the timing of such communications is still random and the magnitude of the changed information being transmitted is still uncontrolled. Therefore, the randomness of this approach may still allow a communications channel to be completely blocked when simultaneous transmission of large amounts of changed data are transmitted simultaneously.

Figure 2:
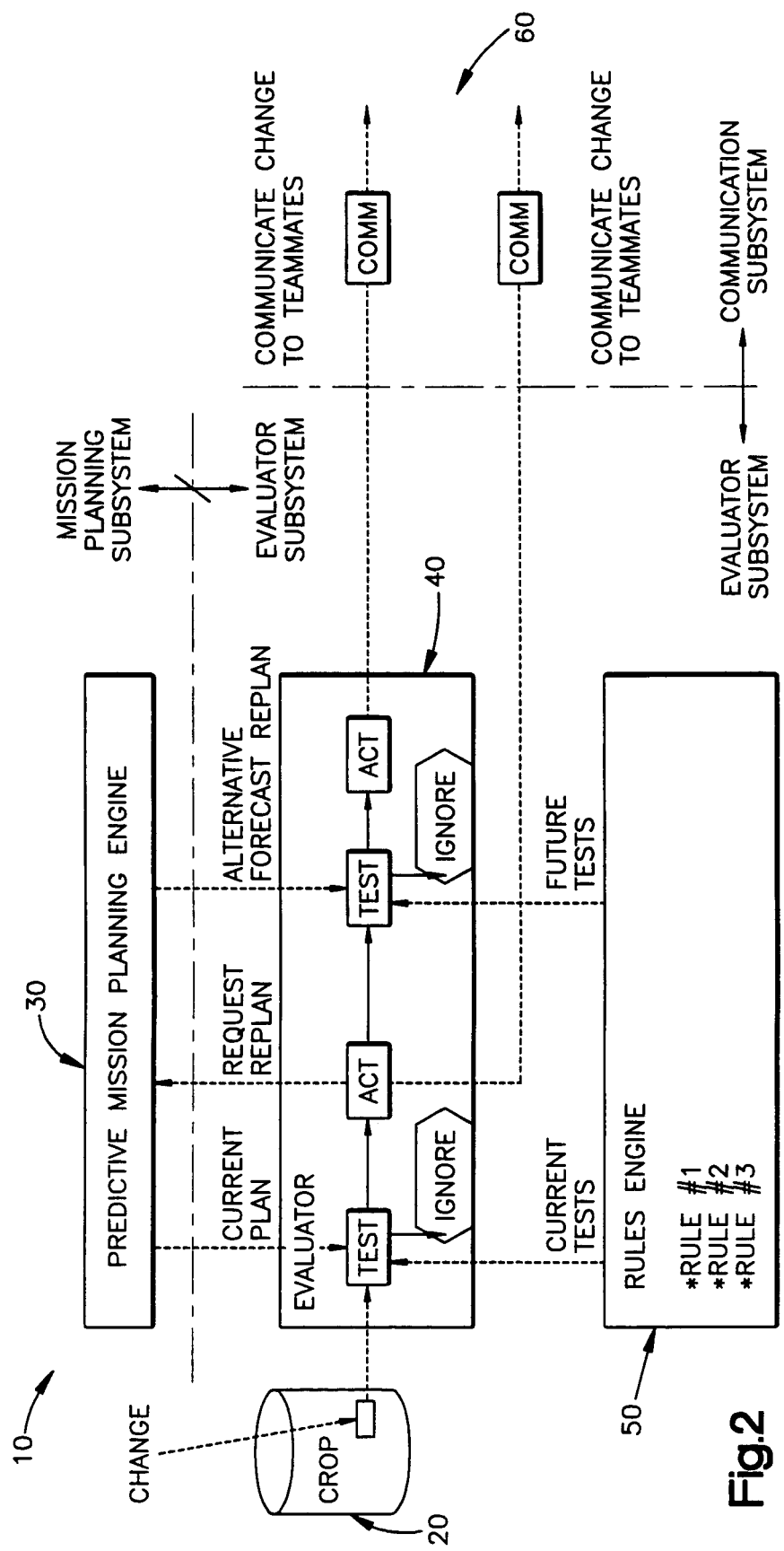
FIG. 2 is a schematic representation of an example system in accordance with the present invention.

A system 10 in accordance with the present invention may evaluate the impact of the changes occurring during a team's mission against a rules engine 50 and a predictive mission-planning engine 30 (FIG. 2). Only those changes containing significant impacts to a team's mission, either imminent impacts or long-term threats to the mission (that cannot be easily corrected by a localized mission replan), may be transmitted between collaborative entities such as UAV1, UAV2, and UAV3 described above. Changes evaluated as unimportant may not be transmitted. Transmissions may also be prioritized and scheduled to control consumption of the bandwidth of a communications channel.

A predictive mission-planning engine 30 of each entity may replan for all entities of the collaborative team of entities. Since each mission-planning engine 30 determines an identical new plan, the system 10 provides a predictive mechanism for a mission plan of the entire team. For example, a change may be unimportant to the mission of the set of collaborative entities over the next five minutes, but will have a major impact within thirty minutes. The converse may also be true.

The example system 10 may develop a set of algorithms that interact with each other, a Common Relevant Operating Picture (CROP) 20, a mission planning subsystem 30, and a communication subsystem 60 (FIG. 2). The system 10 may include a Rules Engine 50 and an Evaluator 40. The CROP 20 may store a comprehensive mission picture. The system 10 initiates changes in the CROP 20 first. Each entity may contain a decentralized CROP 20 that may be divided into two parts. A first part may be common and identical to each entity. For example, the overall mission plan or the digitized map of the battlefield.

A second part may be unique to each entity. For example, a set of observations made by that entity's sensors that have not been significant enough to share with other entities or the identification of information (i.e., a new threat location) that has just been made and not yet communicated to the rest of the collaborating entities.

The mission planning subsystem 30 may execute the current plan and make changes to the plan as the mission unfolds.

The mission planning subsystem 30 may also develop alternative mission plans (predictive in nature) to evaluate potential changes. For example, there may be several significant situations that arise and would initiate a replan such as a commander changing the high level mission, a pop-up threat, and/or one of the entities, important to the mission, developing an engine problem. The communications subsystem 60 may communicate changes to mission plans, flight plans, CROP changes, etc., as necessary, to the other entities comprising the team of collaborating entities.

The rules engine 50 may be preloaded prior to a mission start with a set of configurable rules that changes during the mission may be evaluated against. Example rules may include a less than fifty meter deviation from the flight path on egress is not significant, a deviation of greater than 1 km from the flight path during any part of the mission must be evaluated as to impact on minimum mission success, and/or a significant deviation from the flight path is not significant if the mission's success is not jeopardized. Part of this evaluation may be completed by the mission-planning engine 30.

Initially, a change may be stored in the CROP 20. The evaluation process may thereby be initiated. The change may then be sent to the Evaluator 40, which may have an algorithm evaluating the change against the preset rules stored in the Rules Engine 50. If the change is deemed to be insignificant (i.e., less than a preset threshold), the change may be ignored. This may terminate the evaluation.

If a change appears to be immediately significant to an individual entity's sub-mission, the Evaluator 40 may act by executing a mission replan for that individual entity. The completed mission replan may then be sent to the Evaluator 40 for evaluation against an overall mission plan for the entire team of entities. Even with an apparent large change facing an individual entity, the individual entity may be able to reform and continue it's submission with every expectation of success.

For example, a deviation in a flight path of one kilometer may appear to be significant. However, the team may be able to continue the mission without a significant deviation to the overall mission. No communication may be immediately necessary. This communication may thereby receive a medium priority and be scheduled for transmission when the burden on the communications channel is light.

Conversely, under some circumstances (i.e., limited remaining fuel, etc.), a change may continue to be significant and may jeopardize mission success. An individual entity may have a fuel problem that would cause the entity to be unable to rendezvous with the other entities and continue with a larger team of entities to complete the mission. In this case, the communication may have a high priority and may be executed immediately. Lower priority messages and changes may wait until higher priority messages are executed.

The system 10 thus provides greater efficiency and control over the magnitude of communications between battlefield entities, the burden upon limited communication channel(s), priority and scheduling of critical communication, and/or mission replanning. The system 10 also provides communication and mission management integrated in a way to work together to act on predictions of mission plans and communication needs in order to handle varying situations.

The Evaluator 40 and Rules Engine 50 of the system 10 provide an efficient mechanism to enable autonomous collaborative systems to make decisions. The system 10 efficiently utilizes the communications channel instead of just making the channel larger, or managing the channel on the basis of a prediction of the maximum statistical aggregation of communication burden on the channel.

The system 10 may control the priority, schedule, and timing of communications between collaborating teams of autonomous vehicles thereby providing a deterministic and efficient use of communications channels. The system 10 may be of practicable use to many military and commercial applications (FIG. 2).

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

Figure 3:
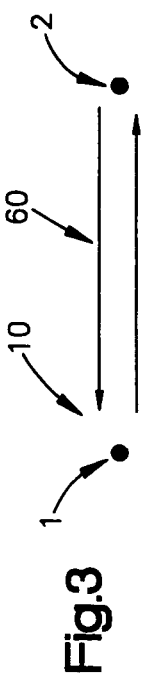
FIG. 3 is a schematic representation of a network for use with the present invention.

An example system 10 (FIG. 3) in accordance with the present invention predictively determines data transmitted within a wireless network in accordance with a mission plan and changes to the mission plan. The system 10 includes a first team member 1 and a second team member 2. The first team member 1 includes a first module 40 for evaluating the changes to the mission plan encountered by the first team member 1 and determining whether to transmit information of the change to the second team member 2. The first team member 1 further includes a second module 50 containing rules for evaluating changes to the mission plan encountered by the first team member 1. The first module 40 utilizes the rules of the second module 50 to predictively alter the mission plan.

Another example system 10 (FIG. 2) in accordance with the present invention predictively determines data transmitted by an entity 1 in accordance with a mission plan and changes to the mission plan. The system 10 includes a mission planning subsystem 30, a communication subsystem 60, and an evaluator subsystem 40, 50. The mission planning subsystem 30 executes a current mission plan. The mission planning subsystem 30 further predictively develops alternative mission plans in order to evaluate potential mission changes. The communication subsystem 60 communicates changes to the mission plan to another entity 2. The evaluator subsystem 40, 50 includes an evaluator 40 and a rules engine 50. The evaluator 40 receives information concerning a change encountered by the entity 1 and utilizes rules from the rules engine 50 for determining whether to communicate the change to the other entity 2.

An example computer program product in accordance with the present invention determines data transmitted by an entity 1 in accordance with a mission plan and changes to the mission plan. The computer program product includes a first instruction for storing the mission plan in a common relevant operating picture 20, a second instruction for evaluating a change to the mission plan, and a third instruction for utilizing the second instruction for determining whether to communicate the change of the mission plan to another entity 2. The second instruction utilizes predetermined rules.

It will be understood that the above description of the present invention is susceptible to various modifications, changes and adaptations, and the same are intended to be comprehended within the meaning and range of equivalents of the appended claims. For example, the evaluator subsystem 40, 50 may be alternatively included in the mission planning subsystem 30 or the communication subsystem 60.

The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for predictively determining data transmitted within a wireless network in accordance with a mission plan and changes to the mission plan, said system comprising:
   a first unmanned aerial vehicle; and
   a second unmanned aerial vehicle,
   said first unmanned aerial vehicle including a first module for evaluating the changes to the mission plan encountered by said first unmanned aerial vehicle and determining whether to transmit information of the change to said second unmanned aerial vehicle, wherein only changes to the mission plan that impact the mission plan beyond a predetermined threshold, set either prior to the start of a mission or revised during a mission execution, of said second unmanned aerial vehicle are communicated to said second unmanned aerial vehicle by said first unmanned aerial vehicle;
   said first unmanned aerial vehicle further including a second module containing rules for evaluating changes to the mission plan encountered by said first unmanned aerial vehicle, said first module further utilizing the rules of the second module to predictively alter the mission plan.

2. The system as set forth in claim 1 wherein said first module executes a mission replan for said first unmanned aerial vehicle.

3. The system as set forth in claim 2 wherein the mission replan is evaluated by the first module against an overall mission plan.

4. The system as set forth in claim 3 wherein said first unmanned aerial vehicle transmits the mission replan to said second unmanned aerial vehicle.

5. The system as set forth in claim 1 further including a common relevant operating picture of the mission plan from which a change to the mission plan may be initiated.

6. The system as set forth in claim 1 wherein said first unmanned aerial vehicle further includes a predictive mission-planning engine for predicting a mission plan of said second unmanned aerial vehicle.

7. The system as set forth in claim 1 wherein said first unmanned aerial vehicle includes a common relevant operating picture of the mission plan from which a change to the mission plan may be initiated, said common relevant operating picture having a first part and a second part, said first part being identical to a part of said second unmanned aerial vehicle.

8. The system as set forth in claim 7 wherein said second part is unique to said first unmanned aerial vehicle.

* * * * *